United States Patent [19]

Benham et al.

[11] Patent Number: 5,364,915
[45] Date of Patent: Nov. 15, 1994

[54] ETHYLENE POLYMERIZATION PROCESS

[75] Inventors: Elizabeth A. Benham; Max P. McDaniel, both of Bartlesville, Okla.

[73] Assignee: Phillips Petroleum Company, Bartlesville, Okla.

[21] Appl. No.: 950,525

[22] Filed: Sep. 25, 1992

[51] Int. Cl.$^5$ ............................................. C08F 4/78
[52] U.S. Cl. ..................................... 526/105; 526/106; 526/129; 526/137; 526/104; 526/348.3; 526/348.4; 526/348.5; 526/348.6; 502/119; 502/228; 502/256
[58] Field of Search .................. 526/105, 106, 129

[56] References Cited

U.S. PATENT DOCUMENTS

| | | | |
|---|---|---|---|
| 4,439,543 | 3/1984 | McDaniel et al. | 502/228 |
| 4,503,201 | 3/1985 | McDaniel et al. | 526/106 |
| 4,596,862 | 6/1986 | McDaniel et al. | 526/106 |
| 4,806,513 | 2/1989 | McDaniel et al. | 502/155 |
| 4,946,914 | 8/1990 | Hsieh | 526/106 |

Primary Examiner—Joseph L. Schofer
Assistant Examiner—David Wu
Attorney, Agent, or Firm—Carl D. Corvin

[57] ABSTRACT

A process to produce a polyethylene composition that has less than 2 weight percent fines, based on the weight of said polyethylene composition, and a fluff bulk density greater than 25 pounds per cubic foot, said process comprising polymerizing ethylene in the presence of a trialkylaluminum compound, and a diluent that is essentially saturated with ethylene under slurry polymerization conditions that comprise a polymerization temperature from 104° C. to 116° C., with an activated catalyst system comprising (a) a catalyst support that comprises a silica compound, wherein said catalyst support has a pore volume less than 2 cubic centimeters per gram, (b) a catalyst that comprises a chromium compound, wherein the amount of chromium in said catalyst system is from about 0.1 to about 20 weight percent, wherein said weight percent is based on the total weight of said catalyst and catalyst support, and (c) a fluorine compound, wherein the amount of fluorine used is from about 0.1 to about 20 weight percent, wherein said weight percent is based on the total weight of said catalyst support.

17 Claims, No Drawings

ETHYLENE POLYMERIZATION PROCESS

BACKGROUND OF THE INVENTION

This invention is related to the field of ethylene polymerization.

Approximately 20 billion pounds of polyethylene is produced each year in the United States. A portion of this polyethylene is produced in the form of "fines". Polyethylene fines are generally particles that are so small they can pass through a 100 mesh screen. This means that the polyethylene fines are smaller than about 150 micrometers or about 0.006 inches. These polyethylene fines can be up to about 15 weight percent of the polymerized product. Usually, these fines are subjected to a compounding step wherein the fines are compounded into larger particles. This compounding step, however, is an additional expense that could decrease the polyethylene producer's ability to compete in the global polyethylene market. Therefore, if the amount of fines generated could be lowered, a significant cost savings could be realized because the resin could be sold as fluff or powder.

As with any process to produce a product, it is desirable from an economic viewpoint to perform as few manipulative steps on the product as possible. In the case of polyethylene, it would be preferable to sell the polyethylene resin as fluff or powder from the reactor. This would eliminate such operations as extruding and pelletizing. However, if the fluff is not compact enough, that is, if the fluff has a low fluff bulk density, it can be uneconomical to transport the fluff to the customer. Therefore, if the fluff bulk density of a polyethylene composition could be raised to a higher level, a significant cost savings could be realized.

SUMMARY OF THE INVENTION

It is an object of this invention to provide an improved polyethylene composition.

It is an object of this invention to provide an improved ethylene polymerization process that produces a polyethylene composition that has less than 2 weight percent fines, based on the weight of the polyethylene composition, and a fluff bulk density greater than 25 pounds per cubic foot (lbs/ft.$^3$).

In accordance with this invention a process to produce a polyethylene composition that has low, preferably less than two weight percent, fines based on the weight of said polyethylene composition, and a high fluff bulk density, preferably greater than 25 pounds per cubic foot, is provided. This process comprises (or optionally consists essentially of, or consists of) polymerizing ethylene, in the presence of a trialkylaluminum compound and a diluent that is essentially saturated with ethylene, under slurry polymerization conditions that comprise a polymerization temperature from 104° C. to 116° C., with an activated catalyst system comprising (or optionally consists essentially of, or consists of) (a) a catalyst support that comprises a silica compound, wherein said catalyst support has a pore volume less than 2 cubic centimeters per gram, (b) a catalyst that comprises a chromium compound, wherein the amount of chromium in said catalyst system is from about 0.1 to about 20 weight percent, wherein said weight percent is based on the total weight of said catalyst and catalyst support, and (c) a fluorine compound, wherein the amount of fluorine used is from about 0.1 to about 20 weight percent, wherein said weight percent is based on the total weight of said catalyst support.

DETAILED DESCRIPTION OF THE INVENTION

In general, the catalyst system used in this invention comprises a catalyst and a catalyst support. The catalyst support is not meant to be construed as an inert component of the catalyst system. In fact, it has been established that catalyst supports can greatly affect the final properties of the catalyst system.

The catalyst support is generally composed of about 80 to about 100 weight percent silica. The remainder, if any, being selected from the group consisting essentially of refractory metal oxides, such as alumina, boria, magnesia, thoria, zirconia, titania, and mixtures of two or more of these refractory metal oxides. The catalyst support can be prepared in accordance with any method known in the art. Suitable methods are disclosed in U.S. Pat. Nos. 3,900,457; 4,081,407; 4,392,990; 4,405,501; 4,735,931; and 4,981,831; the entire disclosures of which are hereby incorporated by reference.

The catalyst support should have a pore volume less than about two cubic centimeters per gram. Pore volume can be determined by one skilled in the art using the method of Innes, in Analytical Chemistry 28, 332 (1956). However, it is preferred that the support have a pore volume from about 0.4 to about 1.6 cubic centimeters per gram; it is more preferred that the pore volume be from about 0.6 to about 1.4 cubic centimeters per gram; and it is most preferred that the pore volume be from 0.8 to 1.2 cubic centimeters per gram. These ranges are preferred for a variety of reasons such as the desired molecular weight of the polymer and the different production economics associated with these low to medium pore volume supports.

The catalyst component of the catalyst system comprises a chromium compound. Suitable chromium compounds are chromium nitrate, chromium acetate, and chromium trioxide. The amount of chromium compound combined with the catalyst support is from about 0.05 weight percent to about 20 weight percent, preferably it is about 0.1 weight percent to about 10 weight percent, and most preferably it is 0.25 weight percent to 5 weight percent, based on the combined weight of the catalyst and the catalyst support. The chromium compound can be combined with the catalyst support in any manner known in the art. Examples of combining the catalyst with the catalyst support are disclosed in the above-cited and incorporated patents.

It is preferred that a fluorine compound be contacted with the catalyst support. The fluorine compound can be contacted with the catalyst support in several different ways. For example, the catalyst support, the fluorine compound, and the chromium compound, can be contacted together in any order, and thereafter, this fluorine/chromium/catalyst support composition can be activated. As another example, the catalyst support can be contacted with the chromium compound, and thereafter, the chromium/catalyst support composition can be activated; after this activation the chromium/catalyst support composition can be contacted with the fluorine compound, and thereafter the fluorine/chromium/catalyst support compound can be activated again. As yet another example, the catalyst support can be contacted with the fluorine compound, and thereafter, this fluorine/catalyst support composition can be activated; after this activation the fluorine/catalyst support composition can be contacted with the chromium compound, and thereafter, the fluorine/chromium/catalyst support compound can be activated again.

A more specific example of contacting the fluorine compound with the catalyst support is as follows. The catalyst support, the chromium compound, and the fluorine compound can be mixed into a slurry composition. Any suitable solvent can be used which does not completely dissolve the fluorine compound, the chromium compound, or the catalyst support. Examples of suitable solvents include, but are not limited to, water, methanol, ethanol, propanol, and butanol. It is within the scope of this invention to use two or more of these solvents. It is, however, preferred to use an alcohol because of their volatility and low surface tension. After forming the slurry composition, it can be dried by any manner known in the art. Examples of drying techniques are suction filtration, evaporation, and vacuum drying. It is also within the scope of this invention to use two or more different drying techniques.

Another more specific example of contacting the fluorine compound with the catalyst support is as follows. The catalyst support and the chromium compound can be contacted together in any manner known in the art. This chromium/catalyst support composition can then be activated. Thereafter, this activated chromium/catalyst support composition can then be contacted with a solid, decomposable fluorine compound. This fluorine/chromium/catalyst support composition can then be further activated. During this activation, the fluorine compound will decompose onto and/or into the catalyst support. Further examples of contacting the fluorine compound with the catalyst support are in U.S. Pat. Nos. 2,825,721 and 4,806,513, the entire disclosures of which are hereby incorporated by reference.

Examples of fluorine compounds are ammonium bifluoride ($NH_4HF_2$), ammonium fluoroborate ($NH_4BF_4$), ammonium silicofluoride (($NH_4)_2SiF_6$), aluminum fluoride ($AlF_3$), phosphorous trifluoride ($PF_3$), and phosphorous pentafluoride ($PF_5$). It is within the scope of this invention to use two or more of these fluorine compounds. The amount of fluorine to incorporate into and/or onto the catalyst support is from about 0.05 weight percent to about 20 weight percent, preferably it is from about 0.1 weight percent to about 10 weight percent and most preferably, it is from 0.25 to 5 weight percent, based on the weight of the catalyst support. The amount of fluorine to incorporate into and/or onto the catalyst support depends on factors such as the productivity desired, the desired polymer properties, the polymerization economics, and any environmental regulations.

Activation can occur in a variety of ways. In general, activation occurs when the chromium compound and/or the fluorine compound is contacted with an oxygen containing ambient. This contacting should take place at a temperature from about 300° C. to about 1000° C. However, the proper temperature range depends on the composition that is to be activated. For example, if a chromium/silica composition is to be activated (the composition has not yet been contacted with the fluorine compound) the entire temperature range of about 300° C. to about 1000° C. may be used. However, it is preferred that a temperature range from about 600° C. to about 950° C. be used; it is more preferred that a temperature range of about 650° C. to about 900° C. be used; and it is most preferred that a temperature range of 675° C. to 875° C. be used. These temperature ranges are preferred, in part, because of the higher catalyst activities that can be obtained by subjecting the chromium compound to these higher temperatures. As another example, if a fluorine/chromium/silica or fluorine/silica composition is to be activated, a temperature range of about 300° C. to about 700° C. should be used. However, it is preferred that a temperature range of about 400° C. to about 700° C. be used; it is more preferred that a temperature range of about 450° C. to about 650° C. be used and it is most preferred that a temperature range of 525° C. to 625° C. be used. These temperature ranges are preferred, in part, because temperatures above 700° C. tend to subject the fluorine-containing compositions to a level of thermal stress which may be detrimental to the final catalyst system.

In summary, if the composition to be activated contains fluorine, activation temperatures below 700° C. should be used; if however, the composition to be activated contains no fluorine, activation temperatures up to 1000° C. may be used. It should be noted that in any case the compositions should be contacted with the oxygen-containing ambient for a time from about 1 minute to about 100 hours.

After this activation, the fluorine/chromium/catalyst support composition is the catalyst system of this invention. It can be used to polymerize ethylene using slurry polymerization techniques. The slurry polymerization process is also known as the particle form process. Such polymerization techniques are well known in the art and are disclosed, for instance, in Norwood, U.S. Pat. No. 3,248,179; the entire disclosure of which is hereby incorporated by reference.

Two preferred polymerization methods for the slurry process are those employing a loop reactor of the type disclosed in Norwood and those utilizing a plurality of stirred reactors either in series, parallel or combinations thereof, wherein the reaction conditions are different in the different reactors. It is possible to copolymerize ethylene with another olefin during this polymerization. Suitable examples are propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures of two or more olefins.

It is essential to the polymerization process of this invention that a trialkylaluminum cocatalyst be present during the polymerization. In general, the alkyl groups of the trialkylaluminum cocatalyst should have from about 1 to about 10 carbon atoms and preferably 2 to 4 carbon atoms. Examples include, but are not limited to, triethylaluminum, tripropylaluminum and trimethylaluminum. The amount of trialkylaluminum cocatalyst used in the polymerization, stated in parts per million by weight, based on the weight of the diluent in the reactor, is from about 0.01 ppm to about 20 ppm. Preferably, it is from about 0.05 ppm to about 10 ppm, and most preferably it is from 0.5 ppm to 5 ppm.

The polymerization temperature is an essential parameter to this invention. The polymerization temperature should be from about 104° C. to about 116° C. It is more preferred that the polymerization temperature be from about 105° C. to about 115° C. It is most preferred that the polymerization temperature be from 107° C. to 113° C. These temperature ranges are preferred because they help produce a resin with a high bulk density and low fines.

It is also important to this invention that the diluent should be substantially saturated with ethylene. The phrase "substantially saturated with ethylene" means that the ethylene concentration in the diluent is at or slightly below the amount where the ethylene would start to separate itself from the diluent thereby forming a separate phase. However, the diluent should not be over saturated with ethylene because of the possibility that the excess ethylene will degass from the diluent. Any degassed ethylene can present a serious hazard to the polymerization process. It is however, difficult to accurately measure the amount of ethylene in the reactor. Consequently, the amount of ethylene in the reactor can be determined by sampling the amount of ethylene in the diluent after the diluent is separated from any recovered polymer. For example, after the polymer forms in the reactor, it can be recovered by any method known in the art. This recovered polymer also contains some diluent. The diluent can be separated from the polymer by flashing the diluent off. It is at this point that the amount of ethylene in the diluent can be determined. After the amount of ethylene is determined, the ethylene concentration in the reactor can be adjusted accordingly.

When the diluent is isobutane, the ethylene concentration in the flashed diluent should be in the range of about 7 to about 14 mole percent based on the number of moles of isobutane present. It is more preferred that the amount of ethylene be from about 8 to about 13 mole percent. It is most preferred that the amount of ethylene be from 9 to 12 mole percent.

EXAMPLES

These examples are provided to further assist a person skilled in the art with understanding this invention. The particular reactants, conditions, and the like, are intended to be generally illustrative of this invention and are not meant to be construed as unduly limiting the reasonable scope of this invention.

All of the polymerization runs in the following examples were conducted in a reactor system comprising:
(1) an 87-liter (23 gallon), 15.2 centimeter (6 inch) diameter pipe loop reactor;
(2) a flash chamber for recovering polymer and diluent; and
(3) a dryer for drying the recovered polymer.

The following materials were used during the polymerization:
(1) ethylene, which had been dried over alumina;
(2) isobutane, which had been degassed by fractionation and dried over alumina;
(3) 1-hexene, which had been degassed by fractionation and dried over alumina; and
(4) triethylaluminum, which was used in the form of a 25 weight percent concentration of triethylaluminum in n-hexane.

Comparative Example I

The catalyst system used in this example contained about 1 weight percent chromium and about 1 weight percent fluoride from $NH_4BF_4$ on silica. The catalyst support had a pore volume of about 1.7 cc/g. Each catalyst was activated at a temperature in the range of 480° C. to 600° C. The polymerization was conducted for 75 minutes at a polymerization temperature from 97° C. to 101° C. The comonomer, 1-hexene, was present in the reactor. The amount of 1-hexene was from about 1.9 to about 2.3 weight percent, based on the amount of ethylene feed to the reactor. The amount of ethylene in the diluent at the flash chamber was from 9–10 mole percent based on the total moles of isobutane. The results are presented in Table E1.

TABLE E1

| | Run Number | | | | | |
|---|---|---|---|---|---|---|
| | 1 | 2 | 3 | 4 | 5 | 6 |
| Fluff Bulk Density[1] | 25.0 | 22.3 | 22.8 | 22.7 | 21.8 | 22.0 |
| Fines[2] | 12.68 | 1.52 | 1.71 | 1.4 | 1.57 | 2.31 |

[1]Measure in accordance with the ASTM-D-1895 apparent density test.
[2]These are the particles smaller than 150 micrometers or about 0.006 inches.

As can be seen from the above data, there was no run which generated both a fluff bulk density greater than 25 and an amount of fines less than 2 weight percent.

EXAMPLE II

The catalyst system used in this example contained about 1 weight percent chromium and about 2 weight percent fluoride from $(NH_4)_2SiF_6$ on silica. The catalyst support had a pore volume of about 0.9–1.05 cc/g. Each catalyst was activated at a temperature in the range of about 535° C. to about 600° C. The polymerizations were conducted for 75 minutes at a polymerization temperature from 106° C. to 110° C. The comonomer, 1-hexene, was present in the reactor in Runs 7, 8, 9, and 14. The amount of 1-hexene was from 0.5 to 0.35 weight percent, based on the amount of ethylene feed to the reactor. The amount of ethylene in the diluent at the flash chamber was from 9 to 12 mole percent based on the total moles of isobutane. The amount of triethylaluminum cocatalyst used was from 0 to 2 parts per million by weight based on the weight of isobutane. The results are presented in Table E2.

TABLE E2

| | Run Number | | | | | | | | | | | | |
|---|---|---|---|---|---|---|---|---|---|---|---|---|---|
| | 7 | 8 | 9 | 10 | 11 | 12 | 13 | 14 | 15 | 16 | 17 | 18 | 19 |
| Polymerization Temp. | 223 | 225 | 224 | 228 | 225 | 227 | 228 | 229 | 229 | 226 | 228 | 230 | 223 |
| $C_2$ Mol % | 9.3 | 9.4 | 9.3 | 9.5 | 9.0 | 11.6 | 11.5 | 11.4 | 11.7 | 11.3 | 9.5 | 9.9 | 10.5 |
| TEA ppm | 1.0 | 1.0 | 0 | 0 | 0 | 2.0 | 2.0 | 1.0 | 0.5 | 2.0 | 1.0 | 2.0 | 2.0 |
| Fluff Bulk Density[1] | 27.8 | 27.0 | 22.4 | 24.5 | 22.6 | 28.2 | 28.2 | 28.9 | 28.9 | 25.8 | 26.8 | 27.9 | 28.2 |
| Fines[2] | 2.55 | 1.37 | 2.95 | 2.31 | 2.69 | 1.36 | 2.06 | 1.67 | 1.85 | 1.61 | 1.82 | 1.46 | 0.59 |

[1]Measure in accordance with the ASTM-D-1895 apparent density test.
[2]These are the particles smaller than 150 micrometers or about 0.006 inches.

It is apparent from the above that without a trialkylaluminum cocatalyst a product with high fluff bulk density and low lines did not occur (see Runs 9, 10, and 11). However, when all parameters were in the appropriate ranges, a product with high fluff bulk density and low fines was obtained (see Runs 8, 12, and 14–19). Run 13 is considered to be an anomalous run. However, Run 7 seems to indicate that another variable is also influencing the polymerization. This variable has not been determined yet. It is apparent though that high bulk densities and low fines are obtainable with this inventive process.

That which is claimed is:

1. A process comprising polymerizing ethylene:
   in the presence of a trialkylaluminum compound and a diluent that is substantially saturated with ethylene; and
   under slurry polymerization conditions that comprise a polymerization temperature from 104° C. to 116° C.; with
   an activated catalyst system comprising:
   (a) a catalyst support that comprises a silica compound, wherein said catalyst support has a pore volume less than 2 cubic centimeters per gram;
   (b) a catalyst that comprises a chromium compound, wherein the amount of chromium in said catalyst system is from about 0.1 to about 20 weight percent, wherein said weight percent is based on the total weight of said catalyst and catalyst support; and
   (c) a fluorine compound, wherein the amount of fluorine used is from about 0.1 to about 20 weight percent, wherein said weight percent is based on the total weight of said catalyst support.

2. A process according to claim 1 further comprising conducting said process in the presence of at least one other alpha-olefin.

3. A process according to claim 2 wherein said alpha-olefin is propylene, 1-butene, 3-methyl-1-butene, 1-pentene, 3-methyl-1-pentene, 4-methyl-1-pentene, 1 1-hexene, 3-ethyl-1-hexene, 1-heptene, 1-octene, 1-nonene, 1-decene, or mixtures of two or more said alpha-olefins.

4. A process according to claim 1 wherein said trialkylaluminum is trimethylaluminum, triethylaluminum, tripropylaluminum, or mixtures of two or more of said trialkylaluminums.

5. A process according to claim 1 wherein said trialkylaluminum is triethylaluminum.

6. A process according to claim 1 wherein said diluent is isobutane.

7. A process according to claim 1 wherein said diluent is isobutane and the amount of ethylene present in said diluent is from about 7 to about 14 mole percent based on the number of moles of isobutane present after recovering said polyethylene composition and separating said diluent therefrom.

8. A process according to claim 7 wherein the amount of ethylene present in said isobutane diluent is from about 7 to about 14 mole percent based on the number of moles of isobutane present after recovering said polyethylene composition and separating said isobutane diluent therefrom.

9. A process according to claim 7 wherein the amount of ethylene present in said isobutane diluent is from about 8 to about 13 mole percent.

10. A process according to claim 7 wherein the amount of ethylene present in said isobutane diluent is from about 9 to about 12 mole percent.

11. A process according to claim 1 wherein said polymerization temperature is from 105° C. to 115° C.

12. A process according to claim 1 wherein said polymerization temperature is from 107° C. to 113° C.

13. A process according to claim 1 wherein said catalyst support has a pore volume from about 0.4 to about 1.6 cubic centimeters per gram.

14. A process according to claim 1 wherein said catalyst support has a pore volume from about 0.6 to about 1.4 cubic centimeters per gram.

15. A process according to claim 1 wherein said catalyst support has a pore volume from 0.8 to 1.2 cubic centimeters per gram.

16. A process according to claim 1 wherein said chromium compound is selected from the group consisting of chromium nitrate, chromium acetate, chromium trioxide, and mixtures of two or more said chromium compounds.

17. A process according to claim 1 wherein said fluorine compound is selected from the group consisting of ammonia bifluoride, ammonia fluoroborate, ammonia silicofluoride, aluminum fluoride, phosphorous trifluoride, phosphorous pentafluoride, and mixtures of two or more said fluorine compounds.

* * * * *

UNITED STATES PATENT AND TRADEMARK OFFICE
CERTIFICATE OF CORRECTION

PATENT NO.   : 5,364,915

DATED        : November 15, 1994

INVENTOR(S)  : Elizabeth A. Benham and Max P. McDaniel

It is certified that error appears in the above-identified patent and that said Letters Patent is hereby corrected as shown below:

In column 7, claim 3, line 36, please delete "1" after the word "4-methyl-1-pentene".

Signed and Sealed this

Fourteenth Day of February, 1995

Attest:

BRUCE LEHMAN

Attesting Officer

Commissioner of Patents and Trademarks